US010221892B2

(12) United States Patent
Tanimoto

(10) Patent No.: US 10,221,892 B2
(45) Date of Patent: Mar. 5, 2019

(54) ROLLING BEARING APPARATUS

(71) Applicant: JTEKT CORPORATION, Osaka-shi, Osaka (JP)

(72) Inventor: Kiyoshi Tanimoto, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/581,724

(22) Filed: Apr. 28, 2017

(65) Prior Publication Data

US 2017/0328410 A1 Nov. 16, 2017

(30) Foreign Application Priority Data

May 11, 2016 (JP) ................................ 2016-095283

(51) Int. Cl.
*F16C 33/66* (2006.01)
*F16C 19/06* (2006.01)

(52) U.S. Cl.
CPC .......... *F16C 33/6659* (2013.01); *F16C 19/06* (2013.01)

(58) Field of Classification Search
CPC .............. F16C 33/6651; F16C 33/6659; F16C 33/6662; F16C 19/06
See application file for complete search history.

(56) References Cited

U.S. PATENT DOCUMENTS 2,280,659 A * 4/1942 Muller ................ F16C 33/6659 384/475
2,838,348 A * 6/1958 Hamm ................ F16C 33/3843 384/466
2,878,894 A * 3/1959 Andrews ............ F16C 33/6659 184/6.9
3,628,835 A * 12/1971 Cornish ................ F16C 19/364 384/465
3,767,013 A * 10/1973 Caldwell ............... F16C 33/664 184/6.18
3,811,743 A * 5/1974 Wren .................... F16C 19/364 384/475
4,342,489 A * 8/1982 Lenz .................. F16C 33/6659 184/6.11

(Continued)

FOREIGN PATENT DOCUMENTS

JP 2004-108388 A 4/2004
JP 2006-194406 A 7/2006

(Continued)

*Primary Examiner* — Alan B Waits
(74) *Attorney, Agent, or Firm* — Oliff PLC

(57) ABSTRACT

A rolling bearing apparatus includes: a bearing including an inner ring, an outer ring, a plurality of rolling elements, and a cage; and an oil supply unit provided axially adjacent to the bearing. The oil supply unit includes: a tank in which to accumulate lubricant; and a pump provided with a nozzle that emits the lubricant as an oil droplet toward a target of the bearing. The oil supply unit further includes a wind guard covering a passing region of the oil droplet thus emitted from the nozzle and having an opening toward a target side. An inner region of the wind guard, including the passing region, has a passage shape causing an airflow from a nozzle-side toward the opening on the target side where a negative pressure is caused due to a bearing rotation.

6 Claims, 7 Drawing Sheets

(56) References Cited

U.S. PATENT DOCUMENTS

| | | | | |
|---|---|---|---|---|
| 6,328,478 | B1 * | 12/2001 | Fukuda | F16C 19/163 384/475 |
| 2008/0069488 | A1 * | 3/2008 | Ueno | F16C 19/163 384/470 |
| 2009/0046965 | A1 * | 2/2009 | Akamatsu | F16C 19/163 384/474 |
| 2016/0025138 | A1 | 1/2016 | Watanabe | |
| 2016/0025141 | A1 | 1/2016 | Tanimoto | |
| 2017/0159713 | A1 * | 6/2017 | Ito | F16C 33/6659 |
| 2017/0234368 | A1 * | 8/2017 | Mori | F16C 37/007 384/467 |
| 2017/0288120 | A1 * | 10/2017 | Higashiyama | F16C 33/6659 |
| 2018/0017052 | A1 * | 1/2018 | Naka | F04B 51/00 |

FOREIGN PATENT DOCUMENTS

| | | |
|---|---|---|
| JP | 2016-023757 A | 2/2016 |
| JP | 2016-023759 A | 2/2016 |

* cited by examiner 10
20
21
22
24
28b
27
25
29
23
26
52
P
28a
51
30
K1
K2
11
55
50
43b
40
17
18
C
43
43a
41
7
8

21
24
28b
22
20
29
25
23
26
54
52
K2
57
61
Y1
P
28a
51
62
11
K1
Y2
K3
L
55
18
50
60
63a
63
41
43c
43
43b
40
43a 21
24
28b
22
20
25
29
23
26
56
28a
59
11
K3
L
18
53
41
40

20
21
24
22
28b
25
29
23
26
52
54
61
P
51
62
K1
K3
K2
57
28a
24
11
L
55
50
60
63a
63
43c
43
43b
18
41
40
43a

ROLLING BEARING APPARATUS

INCORPORATION BY REFERENCE

The disclosure of Japanese Patent Application No. 2016-095283 filed on May 11, 2016 including the specification, drawings and abstract is incorporated herein by reference in its entirety.

BACKGROUND

1. Technical Field

The present disclosure relates to a rolling bearing apparatus including a bearing, and an oil supply unit provided axially adjacent to the bearing.

2. Description of Related Art

In recent years, speedup of a main spindle has been requested to various machine tools for improvement of machining efficiency and production efficiency. When the main spindle rotates at a high speed, a lubricating ability in particular becomes a problem in terms of a bearing that supports the main spindle. In view of this, there has been proposed a rolling bearing apparatus provided in an oil supply unit axially adjacent to the bearing (see Japanese Patent Application Publication No. 2004-108388 (JP 2004-108388 A)). The oil supply unit includes a tank into which lubricant is accumulated, a pump configured to discharge the lubricant in the tank to an annular space between an inner ring and an outer ring, and so on.

SUMMARY

In such a rolling bearing apparatus, the tank into which the lubricant is accumulated and the bearing are provided in a small annular space between a spindle and a housing, so the capacity of the tank is limited. Accordingly, in order to cause the oil supply unit to function for a long period, it is necessary to restrain excessive supply (wasteful consumption) of the lubricant.

As the pump provided in the oil supply unit, there is a pump that can emit the lubricant as an oil droplet. In the oil supply unit including such a pump, from the viewpoint of efficient use of the lubricant, it is preferable that a predetermined amount of the oil droplet be emitted per one discharge operation such that the oil droplet reaches a desired target of the bearing. The amount of the oil droplet to be supplied to the bearing by one discharge operation in the pump can be a few picoliters to a few nanoliters, and it is preferable that the oil droplet reach a rolling element or a raceway as the target, for example.

However, actually, it has been observed that, in addition to the emission of the predetermined amount of the oil droplet (hereinafter referred to as a main oil droplet) from the pump, oil (hereinafter also referred to as a satellite) scattered following the main oil droplet is also discharged. Since an oil amount of the satellite is large relative to an oil amount of the main oil droplet, the lubricant consumed by the tank increases unexpectedly. Further, the satellite following the main oil droplet should reach the target of the bearing, but the satellite may delay from the main oil droplet so as to float around a nozzle of the pump or may be attached to a wall surface of the pump where the nozzle is opened, so that the satellite can be hardly used for lubrication of the bearing. That is, the conventional oil supply unit has a problem that the lubricant may be consumed in vain.

In view of this, the disclosure provides a rolling bearing apparatus that can restrain wasteful consumption of lubricant.

A rolling bearing apparatus of an aspect of the present disclosure includes a bearing including an inner ring, an outer ring, a plurality of rolling elements provided between the inner ring and the outer ring, and a cage holding the plurality of rolling elements; and an oil supply unit provided axially adjacent to the bearing and including a tank into which lubricant is to be accumulated, and a pump provided with a nozzle that receives the lubricant from the tank and emits the lubricant as an oil droplet toward a target of the bearing. The oil supply unit further includes a wind guard covering a passing region of the oil droplet emitted from the nozzle and having an opening toward a target side, and an inner region of the wind guard, including the passing region, has a passage shape causing an airflow from a nozzle side toward the opening on the target side where a negative pressure is caused due to a bearing rotation.

When the bearing rotates, the air in an annular space between the inner ring and the outer ring also rotates. However, due to the wind guard, the oil droplet emitted from the pump can easily reach the target of the bearing. Further, a negative pressure is caused in the opening of the wind guard on the target side by the air thus rotating; the inner region of the wind guard has a passage shape causing the airflow from the nozzle side toward the opening on the target side. This causes an action to carry the lubricant floating around the nozzle to the opening of the wind guard on the target side. As a result, it is possible to eventually supply the lubricant carried to the opening to the bearing on the flow of the air rotating in the annular space, thereby making it possible to restrain wasteful consumption of the lubricant.

In order to cause the airflow in the inner region of the wind guard, a pressure (an atmospheric pressure) on the nozzle side should be made higher than a pressure of the opening on the target side in the inner region. In view of this, a nozzle-side part of the wind guard may be provided with an intake port allowing an air to be taken into the inner region including the passing region from an outer region of the wind guard. Hereby, the pressure (the atmospheric pressure) on the nozzle side can be made higher than the pressure of the opening on the target side in the inner region of the wind guard, so that the airflow like the above can be generated. Further, the passage shape of the inner region may be formed such that a passage cross-section on the nozzle side is larger than a passage cross-section on the opening side. Hereby, the pressure (the atmospheric pressure) on the nozzle side can be made higher than the pressure of the opening on the target side in the inner region of the wind guard, so that the airflow like the above can be generated.

Further, the inner region may have a passage portion on the opening side, a passage portion on the nozzle side with a passage cross-section larger than that on the opening side, and a large-diameter portion having a passage cross-section suddenly expanding from the passage portion on the nozzle side and opposed to a body wall portion of the pump where the nozzle is opened. With this configuration, in the inner region of the wind guard, the pressure (the atmospheric pressure) on the nozzle side can be made higher than the pressure of the opening on the target side, so that the airflow like the above can be generated. Further, it is possible to cause an action to carry the lubricant floating around the nozzle from a wide area to the opening of the wind guard on the target side by the large-diameter portion.

According to the aspect of the present disclosure, it is possible to restrain wasteful consumption of the lubricant and to cause the oil supply unit to function for a long period.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
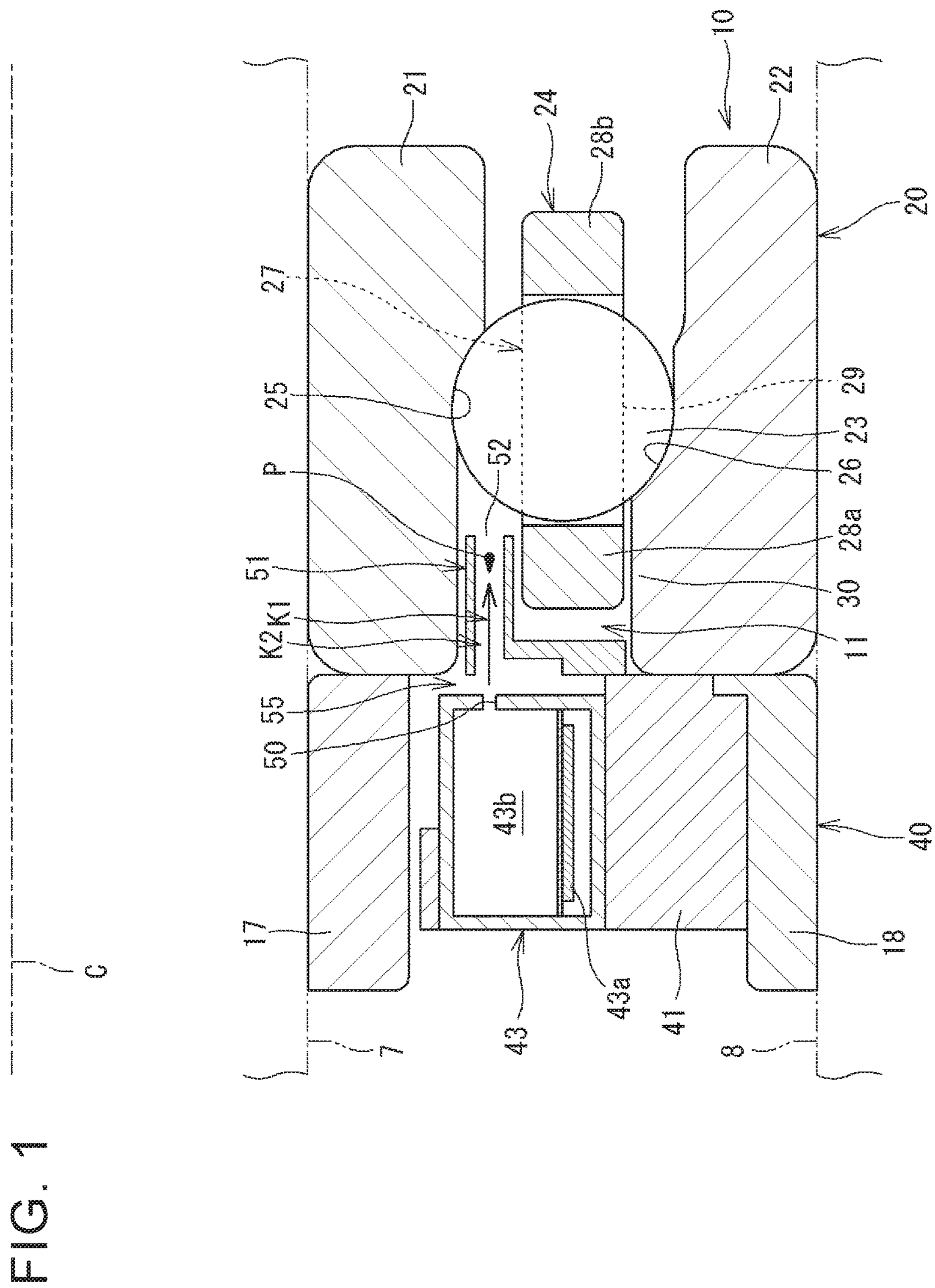
FIG. 1 is a sectional view illustrating one embodiment of a rolling bearing apparatus.

The following describes one embodiment of a rolling bearing apparatus of the disclosure. FIG. 1 is a sectional view illustrating one embodiment of the rolling bearing apparatus. The rolling bearing apparatus 10 (hereinafter also referred to as the bearing apparatus 10) illustrated in FIG. 1 rotatably supports a main spindle (a spindle 7) of a main spindle device included in a machine tool and is accommodated in a bearing housing 8 of the main spindle device. In FIG. 1, the spindle 7 and the bearing housing 8 are indicated by an alternate long and two short dashes line. Note that the bearing apparatus 10 is also applicable to a device other than the machine tool. Further, in the following description, a direction parallel to a center line C of the bearing apparatus 10 is referred to as an axial direction and a direction perpendicular to the axial direction is referred to as a radial direction.

The bearing apparatus 10 includes a bearing 20 and an oil supply unit 40. The bearing 20 includes an inner ring 21, an outer ring 22, a plurality of balls (rolling elements) 23, and a cage 24 holding the plurality of balls 23, so as to constitute a ball bearing (a rolling bearing). Further, the bearing apparatus 10 includes a cylindrical inner ring spacer 17 and a cylindrical outer ring spacer 18.

The oil supply unit 40 is toric as a whole and is attached to a radially inner side of the outer ring spacer 18, so as to be placed adjacent to the bearing 20 in the axial direction. The oil supply unit 40 has a function to supply oil to the bearing 20. The detailed configuration and function of the oil supply unit 40 will be described later. In the present embodiment, the oil supply unit 40 and the outer ring spacer 18 are provided separately, but may be provided integrally. In this case, the oil supply unit 40 has a function to supply oil and also has a function as the outer ring spacer.

In the present embodiment, the outer ring 22, the outer ring spacer 18, and the oil supply unit 40 are non-rotatably attached to the bearing housing 8, and the inner ring 21 and the inner ring spacer 17 rotate together with the spindle 7. Accordingly, the outer ring 22 serves as a fixed ring that does not rotate and the inner ring 21 serves as a rotating ring that rotates together with the spindle 7.

The inner ring 21 is a cylindrical member outwardly engaging with the spindle 7, and a raceway (hereinafter referred to as an inner ring raceway 25) is formed on its outer periphery. In the present embodiment, the inner ring 21 and the inner ring spacer 17 are provided separately, but may be provided integrally (inseparably), although not illustrated herein. The outer ring 22 is a cylindrical member fixed to an inner peripheral surface of the bearing housing 8, and a raceway (hereinafter referred to as an outer ring raceway 26) is formed on its inner periphery. In the present embodiment, the outer ring 22 and the outer ring spacer 18 are provided separately, but may be provided integrally (inseparably), although not illustrated herein.

The balls 23 are provided between the inner ring 21 and the outer ring 22 so as to roll on the inner ring raceway 25 and the outer ring raceway 26. The cage 24 is annular and a plurality of pockets 27 is formed on the cage 24 along a circumferential direction thereof. The balls 23 and the cage 24 are provided in an annular space 11 formed between the inner ring 21 and the outer ring 22.

The cage 24 is annular as a whole, and includes an annular portion **28*a* on first axial side (first side of the axial direction) of the balls 23, an annular portion 28*b* on the second axial side (second side of the axial direction) of the balls 23, and a plurality of bar portions 29 connecting the annular portions 28*a*, 28*b*. A space between the annular portions 28*a*, 28*b* and between the bar portions 29, 29 adjacent to each other in the circumferential direction serves as the pocket 27, and one ball 23 is accommodated in each pocket 27. With this configuration, the cage 24 can hold the plurality of balls 23** at intervals in the circumferential direction.

The annular portion **28*a* of the cage 24 on the first axial side (an oil-supply-unit-40 side) can make slide contact with a shoulder 30 of the outer ring 22. Hereby, the cage 24 is radially positioned by the outer ring 22. That is, the bearing 20 is a bearing configured such that the cage 24** is guided by the outer ring (guided by a bearing ring).

The cage 24 is made of resin (e.g., phenolic resin), and the inner ring 21 and the outer ring 22 are made of steel such as bearing steel. The balls 23 may be made of steel such as bearing steel or may be ceramic.

Figure 2:
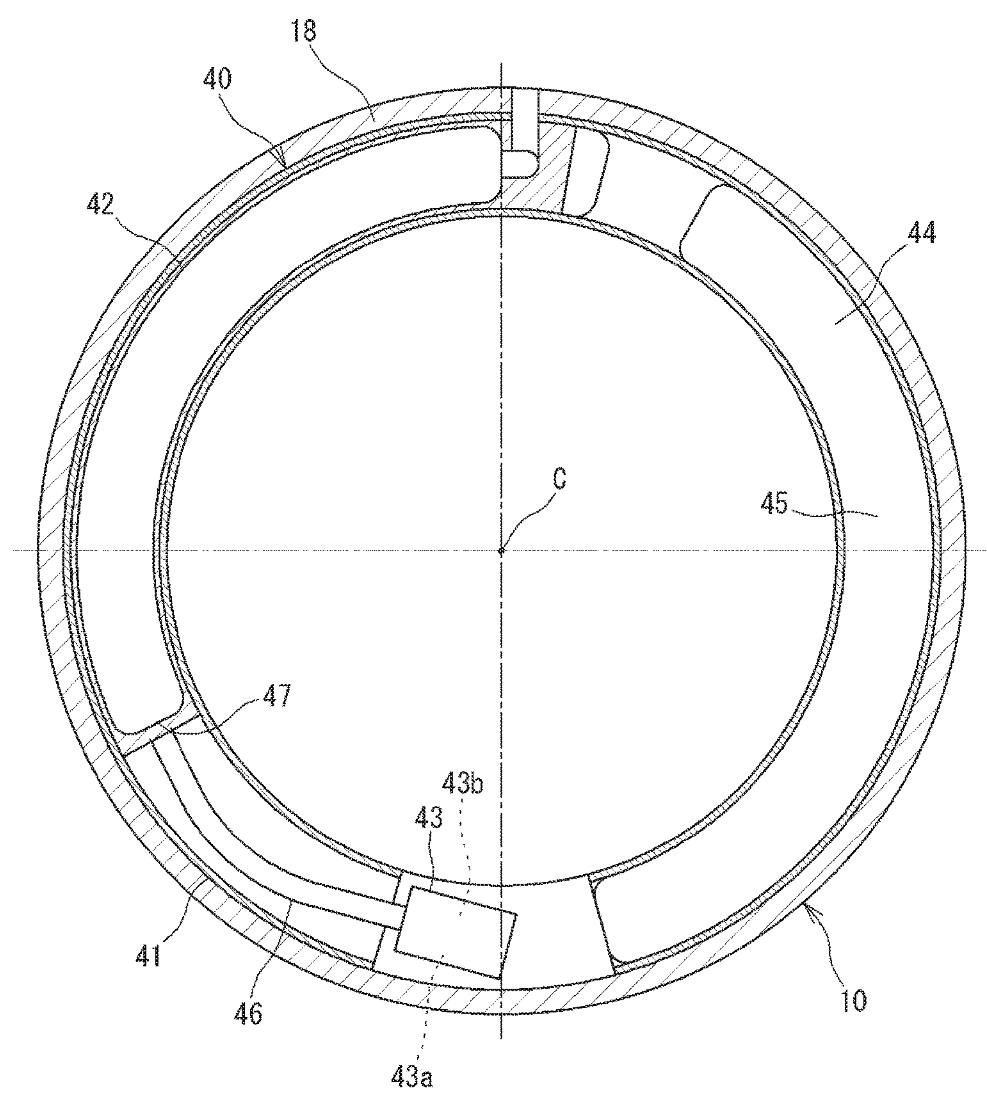
FIG. 2 is a sectional view when an oil supply unit is viewed from an axial direction.

FIG. 2 is a sectional view when the oil supply unit 40 is viewed from the axial direction. The oil supply unit 40 has a toric shape as a whole. The oil supply unit 40 includes a tank 42 and a pump 43. The tank 42 and the pump 43 are provided in an annular body portion 41 included in the oil supply unit 40. Further, the oil supply unit 40 includes a controlling portion 44 and a power supply portion 45, and includes various sensors, although not illustrated herein.

The body portion 41 is attached to an inner peripheral side of the outer ring spacer 18, and has a function as a frame that holds the pump 43 and so on. The body portion 41 is a toric member and has hollow spaces such that the pump 43, the controlling portion 44, and the power supply portion 45 are provided in the hollow spaces. Further, one of the hollow spaces serves as a tank 42. Hereby, the oil supply unit 40 including the body portion 41, the tank 42, the pump 43, the controlling portion 44, the power supply portion 45, and so on is constituted integrally.

In FIG. 2, the tank 42 is provided so as to accumulate lubricant (oil) therein and is connected to the pump 43 via a pipe 46 so that the lubricant flows into the pump 43. A holding material (a porous member) that holds the lubricant is provided in the tank 42, although not illustrated herein.

The pump 43 includes a piezoelectric element 43*a* therein, and when the piezoelectric element 43*a* operates, a volume of an oil chamber (an internal space) 43*b* of the pump 43 is changed, so that the lubricant in the oil chamber 43*b* can be discharged into the annular space 11 of the bearing 20 (see FIG. 1). The oil chamber 43*b* is a space in which to accumulate the lubricant in the pump 43. A nozzle 50 provided in the pump 43 is connected to the oil chamber 43*b*, and is opened toward the axial direction. The lubricant is discharged from the nozzle 50 as an oil droplet P at an initial velocity. That is, the oil droplet P flies from the nozzle 50.

The power supply portion 45 (see FIG. 2) supplies electric power for the operation of the pump 43. The controlling portion 44 can control a timing to operate the pump 43.

Hereby, the pump 43 is configured such that the oil chamber 43*b* receives the lubricant from the tank 42, and the lubricant of the oil chamber 43*b* is emitted (flies) as the oil droplet P from the nozzle 50 toward a target in the bearing 20. One operation of the pump 43 causes a few picoliters to a few nanoliters of the lubricant to be emitted from the nozzle 50 as the oil droplet P. Further, the target in the present embodiment is the balls 23 or the inner ring raceway 25.

Figure 3:
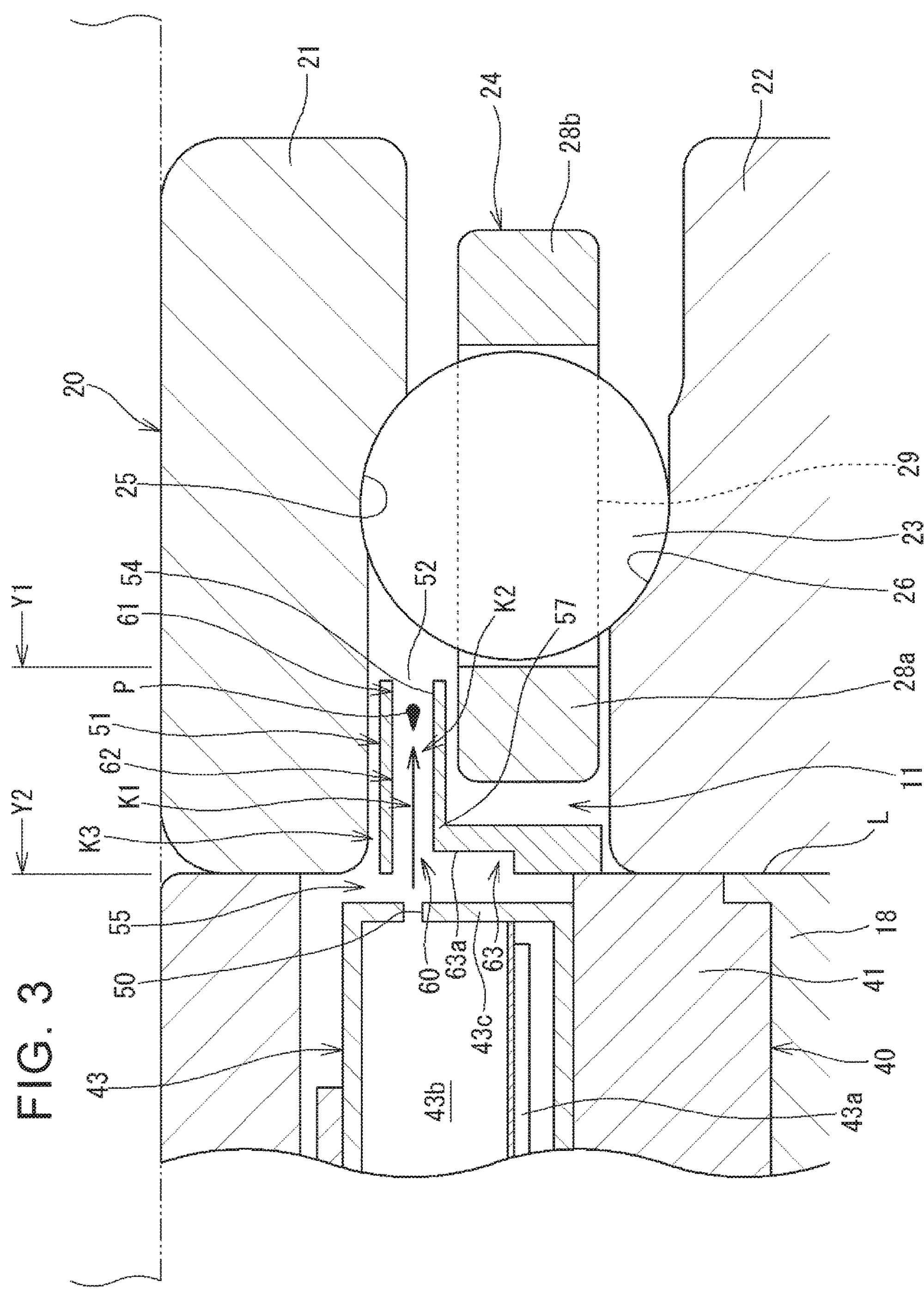
FIG. 3 is a sectional view to describe a schematic configuration of a pump, a wind guard, and their surrounding portion.

As illustrated in FIG. 3, the oil supply unit 40 further includes a wind guard 51 that functions as a windshield for the oil droplet P. FIG. 3 is a sectional view to describe a schematic configuration of the pump 43, the wind guard 51, and their surrounding portion. FIG. 3 is a view in a section including the center line C (see FIG. 1) of the bearing apparatus 10. The wind guard 51 is provided so as to extend in the axial direction from a pump-43 side to the vicinity of the balls 23, and the wind guard 51 has a hole 54 penetrating therethrough in the axial direction. The first axial side (a left side in FIG. 3) of the hole 54 is opened toward the nozzle 50 of the pump 43, and the second axial side (a right side in FIG. 3) of the hole 54 is opened toward the target. A sectional area (an oil-droplet-P passing area) of the hole 54 is sufficiently larger than a sectional area of the nozzle 50 (by ten times or more), and the sectional area of the hole 54 is sufficiently larger than the oil droplet P. On this account, the oil droplet P emitted from the nozzle 50 reaches the target (the balls 23 or the inner ring raceway 25) through the hole 54, so as to be used for lubrication. An inner region K2 inside the wind guard 51 is formed by the hole 54, and the inner region K2 is sectioned from an outer region K3 by the wind guard 51. As described above, the wind guard 51 is configured to cover a passing region K1 of the oil droplet P emitted from the nozzle 50 and to be opened toward the target.

Figure 4:
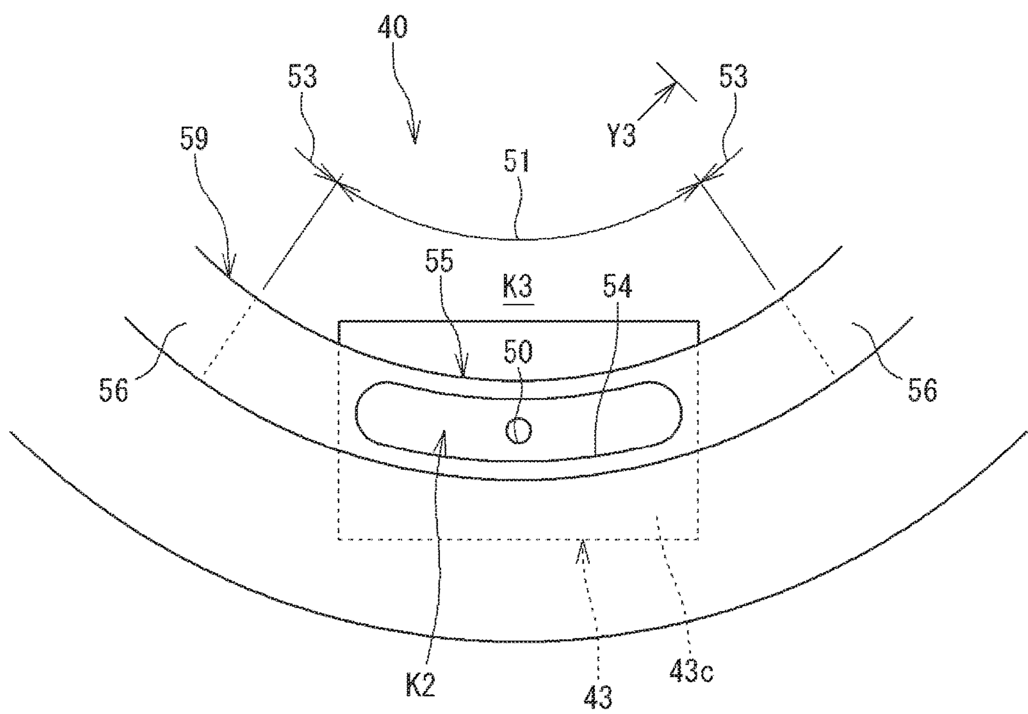
FIG. 4 is a view when the pump, the wind guard, and their surrounding portion are viewed from the axial direction.
Figure 5:
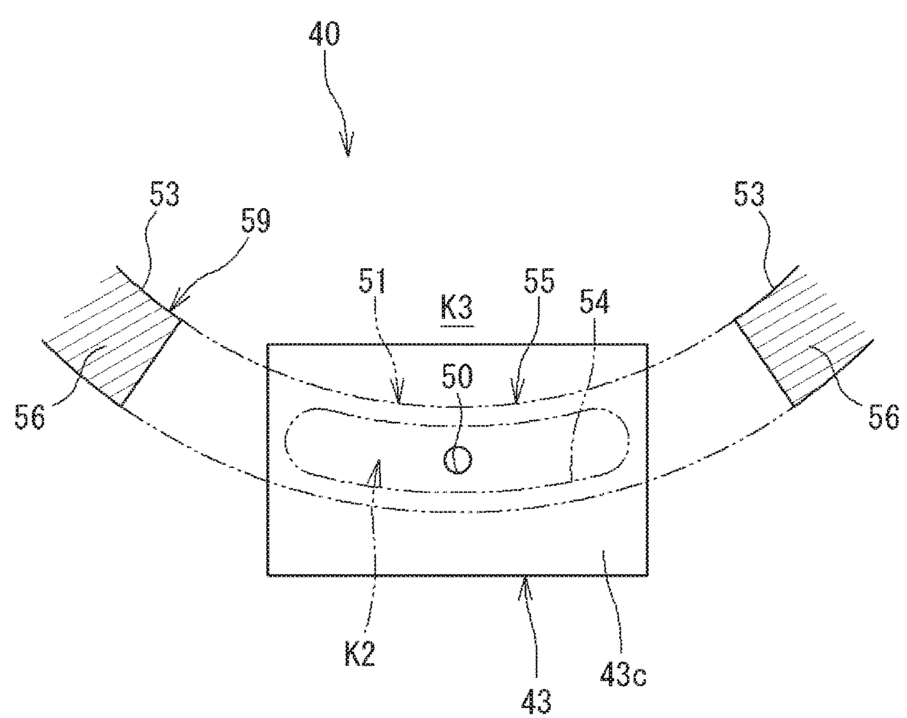
FIG. 5 is a view when the pump, the wind guard, and their surrounding portion are viewed from the axial direction.

FIGS. 4 and 5 are views when the pump 43, the wind guard 51, and their surrounding portion are viewed from the axial direction. FIG. 4 is a view taken along an arrow Y1 in FIG. 3 (note that the constituents of the bearing 20 are omitted), and FIG. 5 is a view taken along an arrow Y2 in FIG. 3 (note that the inner ring spacer 17 and the outer ring spacer 18 are omitted). The oil supply unit 40 includes an attachment portion 53 connected to the wind guard 51. One annular member 59 is constituted by the wind guard 51 and the attachment portion 53, and the annular member 59 is integrated with the body portion 41. The annular member 59 is made of resin, for example. The wind guard 51 is a part of the annular member 59 and has a circular arc shape. As illustrated in FIGS. 3 and 4, the wind guard 51 is opposed to the pump 43 in the axial direction. The attachment portion 53 is an arc portion (with a large range) other than the wind guard 51 in the annular member 59.

The wind guard 51 is provided between the pump 43 and the balls 23 as illustrated in FIG. 3 and is also provided between the inner ring 21 and the annular portion 28*a* of the cage 24. The wind guard 51 of the present embodiment is provided apart from a body wall portion 43*c* of the pump 43 in the axial direction, and a gap formed between the wind guard 51 and the body wall portion 43*c* serves as an air intake port 55 (described later). Since the wind guard 51 is provided apart from the pump 43 as such, the intake port 55 is provided over an entire circumference of the inner region K2, as illustrated in FIG. 5. Note that the wind guard 51 is indicated by an imaginary line (an alternate long and two short dashes line) in FIG. 5. Since the intake port 55 is provided over the entire circumference of the inner region K2, its opening area (an intake port area) is large. Particularly, as illustrated in FIGS. 3 and 5, the opening area of the intake port 55 is sufficiently larger than an opening area of the nozzle 50.

As such, the wind guard 51 has the intake port 55 (see FIG. 3), and the intake port 55 connects, on the pump-43 side, the inner region K2 (that is, the hole 54) including the passing region K1 of the oil droplet P to the outer region K3, which allows the circulation of the air from the outer region K3 to the inner region K2. The inner region K2 is a region inside the wind guard 51 where the oil droplet P passes. In the meantime, the outer region K3 is a region outside the wind guard 51 and is connected to the annular space 11 where the annular portion 28*a* of the cage 24 is provided.

Figure 6:
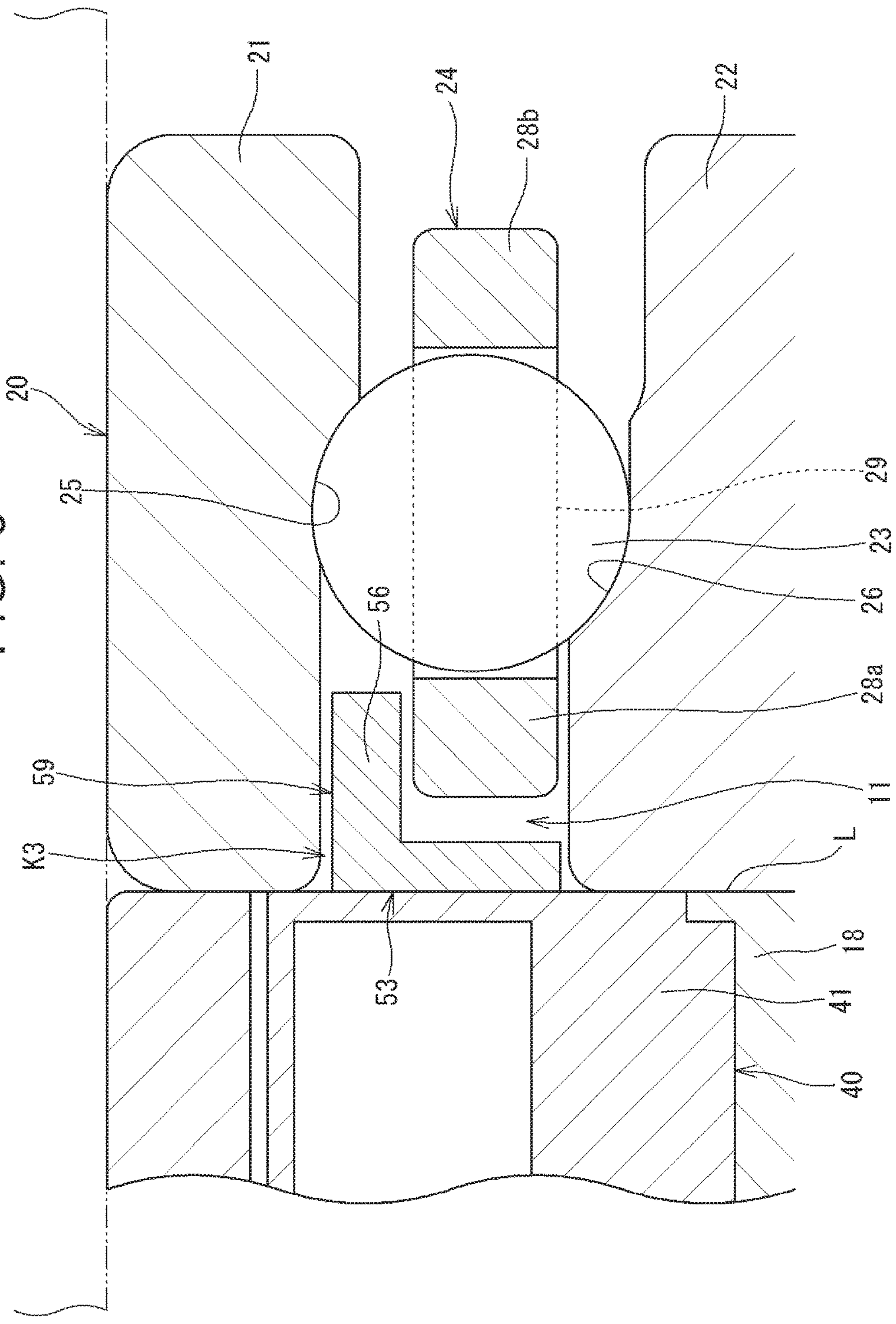
FIG. 6 is a sectional view taken along an arrow Y3 in FIG. 4.

An attachment structure of the wind guard 51 in the oil supply unit 40 is described. As described above (see FIG. 3), the wind guard 51 is provided apart from the body wall portion 43*c* of the pump 43 in the axial direction. In view of this, the attachment portion 53 is connected to one circumferential side and the other circumferential side of the wind guard 51 as illustrated in FIG. 4, and is integrated with the body portion 41 as illustrated in FIG. 6. A measure to integrate them as such may be a measure that uses a machine screw (not shown) and the like, for example, but the attachment portion 53 (and the wind guard 51) and the body portion 41 may be provided as one molded product. FIG. 6 is a sectional view taken along an arrow Y3 in FIG. 4. The attachment portion 53 includes a projecting portion 56 provided so as to extend in the axial direction, and the projecting portion 56 is continuous with the wind guard 51. The projecting portion 56 may have generally the same contour shape as the wind guard 51 (see FIG. 3), but may have a different contour shape therefrom. The wind guard 51 has the intake port 55, and therefore, as apparent from the comparison between FIG. 3 and FIG. 6, an axial length of the wind guard 51 is shorter than the projecting portion 56 (in terms of an axial dimension of the intake port 55). As described above, the attachment portion 53 serves as a part by which the wind guard 51 is attached to the body portion 41 functioning as a frame of the oil supply unit 40. That is, the wind guard 51 is attached to the body portion 41 of the oil supply unit 40 by the attachment portion 53.

A function of the wind guard 51 and a function of the intake port 55 provided in the wind guard 51 are described. In FIG. 3, when the inner ring 21 rotates, the balls 23 and the cage 24 rotate, and accordingly, the air in the annular space 11 between the inner ring 21 and the outer ring 22 rotates following the cage 24. Particularly, when the inner ring 21 rotates at a high speed, the air in the annular space 11 also rotates at a high speed. In a case where the wind guard 51 is not provided, when the oil droplet P is emitted from the pump 43, the oil droplet P may be carried (flowed) by the flow of the air thus rotating, so that the oil droplet P may not reach a desired target (the balls 23 or the inner ring raceway 25). However, the oil supply unit 40 of the present embodiment is provided with the wind guard 51, and the wind guard 51 covers the passing region K1 of the oil droplet P thus emitted from the nozzle 50 and is opened toward a target side. The wind guard 51 prevents the oil droplet P from the air rotating in the annular space 11 and allows the oil droplet P to pass through the inner region K2 linearly, so that the oil droplet P easily reaches the target.

Further, the oil supply unit 40 including such a wind guard 51 has a function to prevent the lubricant from being drawn out from the pump 43 as a first function, and a function to cause an airflow in the wind guard 51 as a second function, and the following describes these functions.

First described is the first function. The wind guard 51 is provided so as to extend in the axial direction from the pump-43 side, and is opened in the annular space 11 so that a tip end 52 thereof is exposed to the air rotating in the annular space 11. Because of this, a negative pressure is generated in the tip end 52 of the wind guard 51. The negative pressure is generated when the air in the tip end 52 (an opening) is pulled by the rotating air, and a pressure of the air in the tip end 52 is lower than pressures of the outer region K3 and the annular space 11 connected thereto. In view of this, in the present embodiment, when a negative pressure is generated in the tip end 52 of the wind guard 51, the air in the outer region K3 can be taken into the inner region K2 from the intake port 55 of the wind guard 51. This prevents the negative pressure in the tip end 52 from affecting a base-portion-57 side of the wind guard 51 in the inner region K2. That is, the air is taken from the intake port 55, so as to prevent a nozzle-50-opening side in the inner region K2 from becoming a negative pressure. As a result, it is possible to prevent the lubricant in the oil chamber 43*b* of the pump 43 from being drawn (leaked) through the nozzle 50 due to the negative pressure on the nozzle-50-opening side even though the pump 43 (the piezoelectric element 43*a*) is not driven.

Particularly, in the present embodiment (see FIG. 2), the tank 42 is connected to the pump 43 via the pipe 46, and a check valve that prevents the lubricant from freely flowing from the tank 42 to the pump 43 is not provided between an outlet 47 of the tank 42 and the oil chamber 43*b* provided in the pump 43. That is, the outlet 47 of the tank 42 and the oil chamber 43*b* of the pump 43 are connected to each other by a passage where the lubricant can freely flow from the outlet 47 to the oil chamber 43*b*. Note that the lubricant is not freely discharged from the nozzle 50 due to the surface tension of the lubricant, but the lubricant is discharged from the nozzle 50 on the condition that the pump 43 (the piezoelectric element 43*a*) operates, so that the lubricant is automatically refilled into the oil chamber 43*b* of the pump 43 from the tank 42 due to this discharge. Accordingly, in FIG. 3, a negative pressure is generated on the nozzle-50-opening side in the inner region K2 as described above, and when a force due to the negative pressure is superior to the surface tension, the lubricant in the oil chamber 43*b* might be drawn (leaked) through the nozzle 50. In view of this, in the present embodiment, the intake port 55 of the wind guard 51 prevents the nozzle-50-opening side from becoming a negative pressure, thereby preventing the lubricant from being drawn (leaked) from the nozzle 50.

As described above, the bearing apparatus 10 of the present embodiment is provided with the intake port 55 at a nozzle-50-side part of the wind guard 51, and the intake port 55 allows the air to be taken into the inner region K2 including the passing region K1 of the oil droplet P from the outer region K3 of the wind guard 51. On this account, when the inner ring 21 rotates, a negative pressure is generated in the opening (the tip end 52) of the wind guard 51 on the target side, but when the air is taken into the inner region K2 from the intake port 55, it is possible to reduce (eliminate) the negative pressure on the nozzle-50 side. As a result, it is possible to prevent more lubricant than necessary from being discharged from the pump 43 due to the negative pressure generated in the opening (the tip end 52) of the wind guard 51 on the target side.

Particularly, the intake port 55 is formed in a region near the nozzle 50. This is to take the air from a region where the influence of the flow of the air in the annular space 11 is as small as possible. More specifically, in the present embodiment, the intake port 55 is provided on a side closer to the pump 43 than the cage 24 (the annular portion 28*a*). Further more specifically, the intake port 55 is provided in a range of the oil supply unit 40 in terms of the axial direction. That is, the intake port 55 is provided on a side further closer to the first axial side (the left side in FIG. 3) than a border L (a contacting face) between the oil supply unit 40 on the first axial side (the left side in FIG. 3) and the bearing 20 on the second axial side (the right side in FIG. 3).

In the embodiment illustrated in FIG. 3, the wind guard 51 is provided axially apart from the body wall portion 43*c* of the pump 43 where the nozzle 50 is opened, so that the intake port 55 is formed between the wind guard 51 and the body wall portion 43*c*. With this configuration, the negative pressure around the opening side of the nozzle 50 is reduced, thereby preventing more lubricant than necessary from being discharged from the pump 43. Further, since the opening area of the intake port 55 is large (much larger than the opening area of the nozzle 50), the intake port 55 can sufficiently take the air therein, thereby making it possible to more surely reduce the negative pressure on the nozzle-50 side. Note that, although not illustrated herein, as another embodiment, the wind guard 51 may be connected to the body wall portion 43*c* and a through-hole may be formed in the base portion 57 of the wind guard 51, so that the through-hole serves as the intake port 55.

Further, in the present embodiment, as described above, the intake port 55 is provided over the entire circumference of the wind guard 51, thereby increasing an action to reduce the negative pressure on the nozzle-50 side. Even though the intake port 55 is provided over the entire circumference, the oil supply unit 40 includes the attachment portion 53 provided so as to extend in the circumferential direction from the wind guard 51 and to be attached to the body portion 41, so that the wind guard 51 can be supported by the attachment portion 53 based on the body portion 41.

Descriptions are now made of the second function. As described above (see FIG. 3), the wind guard 51 has the hole 54 penetrating therethrough in the axial direction, and a passage 60 including the hole 54 (the inner region K2) is formed in the wind guard 51. The passage 60 is a passage through which the oil droplet P emitted from the nozzle 50 as described above passes, and serves as a passage causing an airflow from the nozzle-50 side toward the opening of the tip end 52. Note that the airflow is caused by the negative pressure generated by the rotation of the bearing on the tip-end-52 side of the wind guard 51 and is caused such that the air is taken (sucked) into the wind guard 51 from the intake port 55 due to the negative pressure.

A configuration to cause such an airflow is described. As described above, the intake port 55 is provided in the nozzle-50-side part of the wind guard 51. The intake port 55 allows the air to be taken into the inner region K2 including the passing region K1 of the oil droplet P from the outer region K3 of the wind guard 51. Hereby, a negative pressure is caused on a tip-end-52-opening side in the inner region K2 of the wind guard 51, that is, in the passage 60. However, a pressure (an atmospheric pressure) on the nozzle-50 side can be made higher than a pressure (a negative pressure) on the tip-end-52 opening side, thereby resulting in that the air is sucked into the wind guard 51 from the intake port 55 due to the negative pressure generated on the tip-end-52 side and causes the airflow directed from the nozzle-50 side toward the opening of the tip end 52. Note that the passage 60 includes the intake port 55, the inner region K2, and the opening of the tip end 52.

Figure 7:
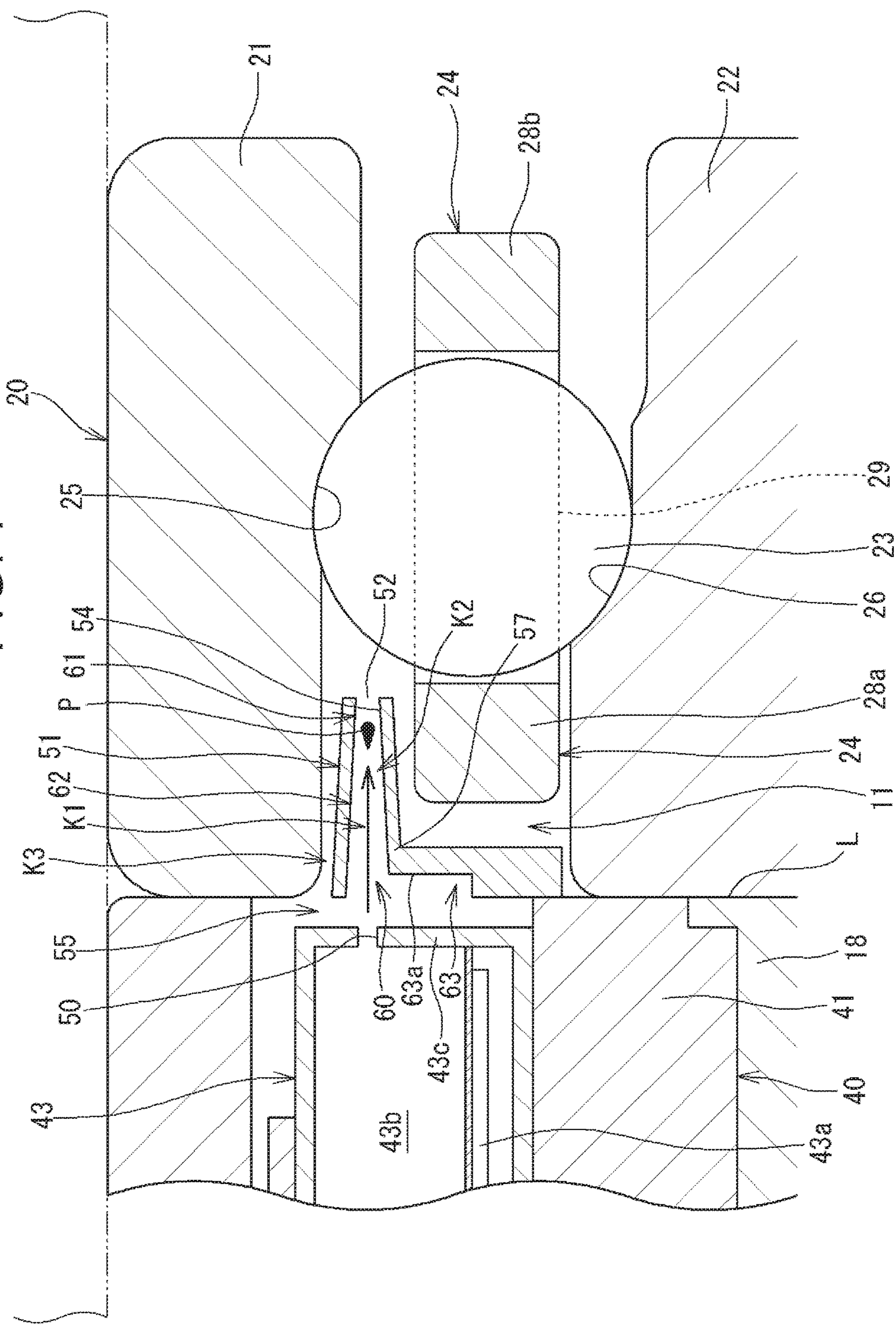
FIG. 7 is a sectional view to describe the schematic configuration of the pump, the wind guard, and their surrounding portion.

Further, in order to more effectively cause such an airflow, the inner region K2 of the wind guard 51 has, as a preferable passage shape of the passage 60, a shape in which a passage cross-section on the nozzle-50 side is larger than a passage cross-section of the tip-end-52-opening side, as illustrated in FIG. 7. That is, the inner region K2 of the wind guard 51 has a passage shape to be narrowed toward the target side. In FIG. 7, the inner region K2 is linearly narrowed toward the target side, but may be narrowed in a stepped manner (not illustrated herein). Further, in FIG. 7, by reducing a radial dimension of the inner region K2, the inner region K2 is narrowed toward the target side. The radial dimension is set such that a tip-end-52 side is made smaller than the base portion 57 by 0.1 millimeters or more. In order that the inner region K2 is narrowed toward the target side, a circumferential dimension thereof may be reduced other than a method of reducing the radial dimension. That is, at least one of the radial dimension and the circumferential dimension should be made small.

The passage shape of the passage 60 is described further more specifically. The inner region K2 included in the passage 60 includes a passage portion 61 (hereinafter referred to as a first passage portion 61) on the tip-end-52-opening side, and a passage portion 62 (hereinafter referred to as a second passage portion 62) on the nozzle-50 side. In a case illustrated in FIG. 7, a passage cross-section of the second passage portion 62 is larger than that of the first passage portion 61. Further, the inner region K2 includes a large-diameter portion 63 having a passage cross-section suddenly expanding from the second passage portion 62. The hole 54 is a through-hole, whereas the large-diameter portion 63 has a shape of a counterbore. The large-diameter portion 63 is opposed to the body wall portion 43*c* of the pump 43 where the nozzle 50 is opened. It is preferable that the passage cross-section of the large-diameter portion 63 be at least twice as large as that of the second passage portion 62.

Note that, in the configuration illustrated in FIG. 3, in the inner region K2 in the wind guard 51, the first passage portion 61 and the second passage portion 62 have the same passage cross-section, but similarly to FIG. 7, the inner region K2 includes the large-diameter portion 63 having a passage cross-section suddenly expanding from the second passage portion 62, and the large-diameter portion 63 is opposed to the body wall portion 43*c* of the pump 43.

In FIG. 7, the large-diameter portion 63 has a surface 63*a* parallel to the body wall portion 43*c* and is formed in the shape of the counterbore as described above. However, the large-diameter portion 63 may have other shapes, e.g., a bell-mouth shape and a tapered shape. The intake port 55 is provided on a pump-43 side of the large-diameter portion 63. As described above, when the bearing 20 rotates, the opening of the tip end 52 of the wind guard 51 has a negative pressure relative to the outer region K3 (the annular space 11). Accordingly, the air taken from the intake port 55 due to the negative pressure passes through the large-diameter portion 63 and flows through the second passage portion 62 and the first passage portion 61 toward the opening of the tip end 52.

Hereby, the inner region K2 of the wind guard 51 can have a passage shape causing the airflow from the nozzle-50 side toward the opening on the target side where the negative pressure is caused due to the rotation of the bearing, thereby yielding an action to carry the lubricant floating around the nozzle 50 to the opening of wind guard 51 on the target side through the inner region K2. As a result, it is possible to eventually supply the lubricant carried to the opening to the bearing 20 on the flow of the air rotating in the annular space 11, thereby making it possible to restrain wasteful consumption of the lubricant.

Particularly, in the oil supply unit 40 of the present embodiment, from the viewpoint of efficient use of the lubricant, a predetermined amount of the oil droplet P is emitted by one discharge operation in the pump 43, so that the oil droplet P reaches the target of the bearing 20. The amount of the oil droplet P to be supplied to the bearing 20 (the target) by one discharge operation in the pump 43 is from a few picoliters to a few nanoliters, for example, and the oil droplet P of this amount reaches the target by the wind guard 51. However, actually, in addition that the predetermine amount of the oil droplet P (hereinafter referred to as a main oil droplet P) is emitted from the pump 43, the lubricant (hereinafter also referred to as a satellite) scattered following the main oil droplet P may be also discharged. The satellite following the main oil droplet P may delay from the main oil droplet P in the wind guard 51, and may float around the nozzle 50 of the pump 43 or may be attached to the body wall portion 43*c* of the pump 43 where the nozzle 50 is opened. In view of this, in the oil supply unit 40 of the present embodiment, the passage 60 including the hole 54 (the inner region K2) is formed by the wind guard 51 as described above, and the passage 60 serves as the passage causing the airflow from the nozzle-50 side toward the opening of the tip end 52. On this account, the lubricant (the satellite) floating around the nozzle 50 or attached to the body wall portion 43*c* of the pump 43 can be carried by the airflow to the opening of the tip end 52 of the wind guard 51. As a result, it is possible to eventually supply the lubricant (the satellite) carried to the opening to the bearing 20 on the flow of the air rotating in the annular space 11, thereby making it possible to restrain wasteful consumption of the lubricant.

As such, in order to cause the airflow in the inner region K2 of the wind guard 51, the pressure (the atmospheric pressure) on the nozzle-50 side should be made higher than the pressure of the opening of the tip end 52 in the inner region K2. In view of this, in the present embodiment, the intake port 55 that allows the air to be taken into the inner region K2 from the outer region K3 is provided in the nozzle-50-side part of the wind guard 51. Further, the inner region K2 has a shape in which the passage cross-section on the nozzle-50 side is larger than the passage cross-section of the tip-end-52-opening side. Hereby, the pressure (the atmospheric pressure) on the nozzle-50 side can be made higher than the pressure of the opening of the tip end 52 in the inner region K2, so that the airflow like the above can be caused.

Further, in the present embodiment, the inner region K2 has the large-diameter portion 63 having a passage cross-section suddenly expanding from the second passage portion 62 on the nozzle-50 side and opposed to the body wall portion 43*c* of the pump 43. Accordingly, it is possible to cause an action to collect the lubricant (the satellite) floating around the nozzle 50 by the large-diameter portion 63 from a wide range and to carry the lubricant to the opening of the wind guard 51 on the target side.

According to the bearing apparatus 10 including the oil supply unit 40 having the above-mentioned configuration, the lubricant (the satellite) scattered following the predetermined amount of the main oil droplet P discharged from the pump 43 can be also used for lubrication of the bearing 20 eventually, thereby making it possible to restrain wasteful consumption of the lubricant and to cause the oil supply unit 40 to function for a long period.

Further, it is preferable that at least one passage portion out of the first passage portion 61, the second passage portion 62, and the large-diameter portion 63 in the passage 60 have a configuration that increases a lipophilic property with the lubricant. The configuration can be a configuration subjected to surface treatment so as to have the lipophilic property, a configuration provided with a texture, a configuration to which an oil absorption mat is attached, and the like. Hereby, it is possible to easily catch the lubricant (satellite) floating in the wind guard 51 as the lubricant for the bearing 20.

The embodiments described herein are just examples in all respects and are not limitative. That is, the rolling bearing apparatus of the present disclosure is not limited to the embodiments illustrated herein, but may have other embodiments within a scope of the present disclosure. The embodiments deal with a case where the bearing 20 is an angular contact ball bearing. However, the type of the bearing is not limited to this, but may be a deep groove ball bearing, a tapered roller bearing, or a cylindrical roller bearing. Further, the rolling bearing apparatus 10 can be used for a purpose except the main spindle of the machine tool.

What is claimed is:

1. A rolling bearing apparatus comprising:

a bearing including an inner ring, an outer ring, a plurality of rolling elements provided in a space between the inner ring and the outer ring, and a cage holding the plurality of rolling elements; and an oil supply unit provided axially adjacent to the bearing and including a tank in which lubricant is to be accumulated, and a pump provided with a nozzle that receives the lubricant from the tank and emits the lubricant as an oil droplet toward a target of the bearing, wherein:

the oil supply unit further includes a non-rotatable wind guard covering a passing region of the oil droplet emitted from the nozzle, the wind guard having an opening toward a target side, and the wind guard being non-rotatable relative to the outer ring, and an inner region of the wind guard, including the passing region, has a passage shape which causes an airflow to be generated toward the opening of the wind guard due to a negative pressure being generated in the opening of the wind guard, the negative pressure being generated as a result of a bearing rotation, and a passage of the wind guard, including the inner region, and through which the oil droplet emitted from the nozzle passes, extends completely through the wind guard in an axial direction of the rolling bearing apparatus and is located at least partially in the space.

2. The rolling bearing apparatus according to claim 1, wherein a nozzle-side part of the wind guard is provided with an intake port that is configured to allow air to be taken into the inner region, including the passing region, from an outer region of the wind guard.

3. The rolling bearing apparatus according to claim 2, wherein:

the oil supply unit contacts the bearing at a contacting face, and the intake port is disposed laterally of the contacting face in a first axial direction such that the contacting face is between the intake port and the plurality of rolling elements.

4. The rolling bearing apparatus according to claim 1, wherein the passage shape of the inner region is formed such that a passage cross-section on a nozzle side is larger than a passage cross-section on an opening side.

5. The rolling bearing apparatus according to claim 1, wherein the wind guard is provided between the inner ring and an annular portion of the cage.

6. A rolling bearing apparatus comprising:

a bearing including an inner ring, an outer ring, a plurality of rolling elements provided between the inner ring and the outer ring, and a cage holding the plurality of rolling elements; and an oil supply unit provided axially adjacent to the bearing and including a tank in which lubricant is to be accumulated, and a pump provided with a nozzle that receives the lubricant from the tank and emits the lubricant as an oil droplet toward a target of the bearing, wherein:

the oil supply unit further includes a non-rotatable wind guard covering a passing region of the oil droplet emitted from the nozzle, the wind guard having an opening toward a target side, and the wind guard being non-rotatable relative to the outer ring, an inner region of the wind guard, including the passing region, has a passage shape which causes an airflow to be generated toward the opening of the wind guard due to a negative pressure being generated in the opening of the wind guard, the negative pressure being generated as a result of a bearing rotation, and the inner region has a passage portion on an opening side, a passage portion on a nozzle side with a passage cross-section that is larger than a passage cross-section on the opening side, and a large-diameter portion having a passage cross-section that expands from the passage portion on the nozzle side and that is opposed to a body wall portion of the pump where the nozzle is opened.

* * * * *